April 29, 1952  J. SLECHTA  2,594,593
CONSTRUCTIONAL UNIT FOR THE CONTROL OF THE
AILERONS AND ELEVATOR OF AIRPLANES
Filed Jan. 28, 1948  2 SHEETS—SHEET 1
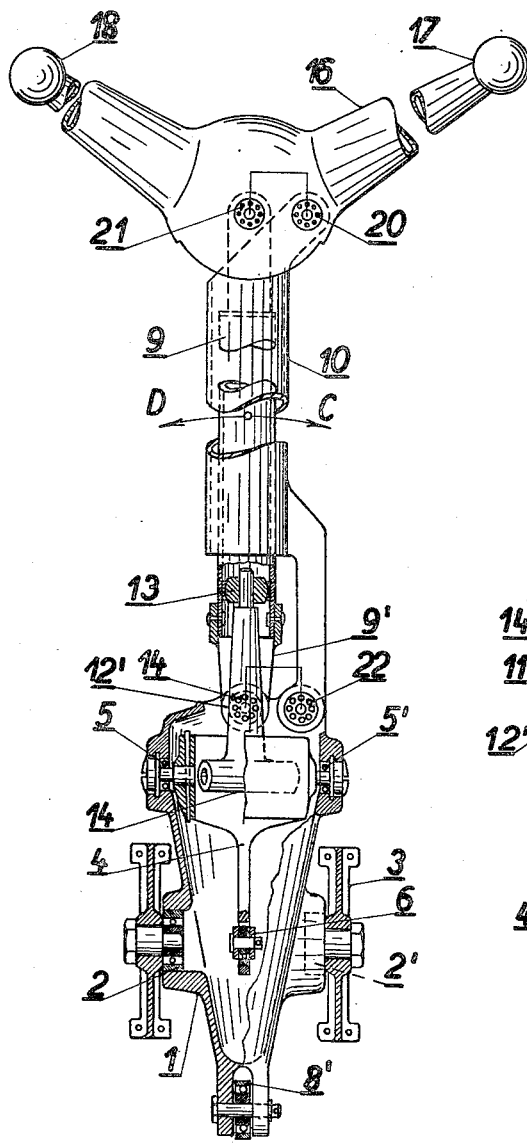
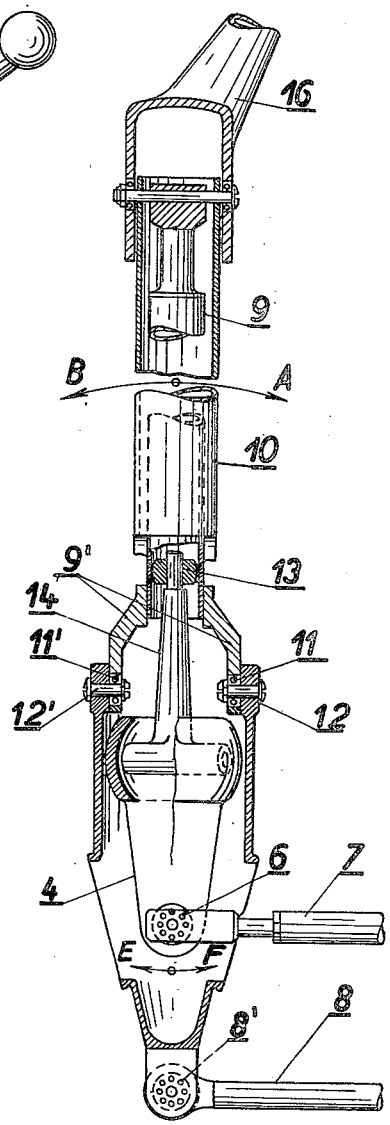
Inventor:
Jaroslav Šlechta

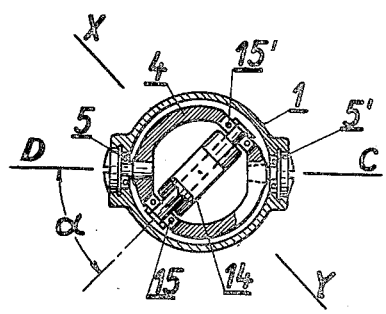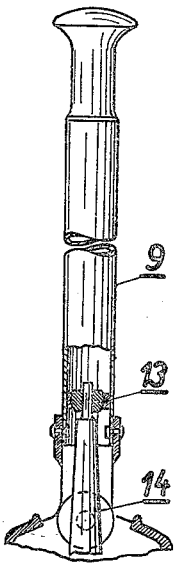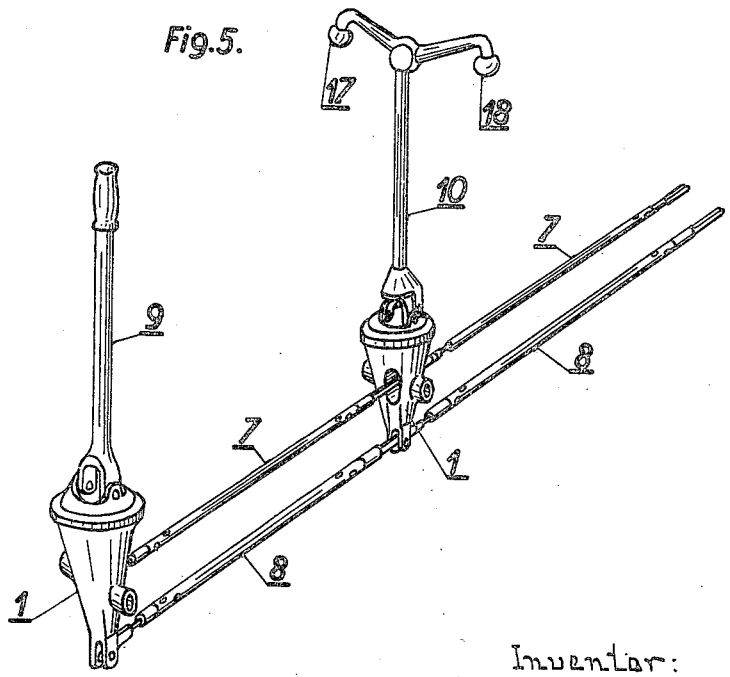

Patented Apr. 29, 1952

2,594,593

UNITED STATES PATENT OFFICE 2,594,593

CONSTRUCTIONAL UNIT FOR THE CONTROL OF THE AILERONS AND ELEVATOR OF AIRPLANES

Jaroslav Šlechta, Prague-Vysočany, Czechoslovakia, assignor of one-half to Aviation Works, National Corporation, Prague, Czechoslovakia Application January 28, 1948, Serial No. 4,747
In Czechoslovakia November 15, 1946

Section 1, Public Law 690, August 8, 1946
Patent expires November 15, 1966

3 Claims. (Cl. 74—471)

The present invention relates to the arrangement of the constructional unit for the control of the ailerons and of the elevator in single-seater airplanes or in airplanes with a plurality of seats behind each other or side-by-side.

There are many familiar arrangements for transmitting the control movements from the driver's hand unto the ailerons and unto the elevator of the airplane. To this purpose, usually, a longitudinal and a cross shaft are used, whereto respectively the control rod and the elements for transmitting the movement to the ailerons and to the elevator are attached, said elements being e. g. wires, cables links or the like. All such devices are, in principle, Cardan joints serving for the suspension of the control rod and enabling the same to be deflected in all directions the general arrangement being such that any longitudinal components of the movements of said control rod are moving the elevator, whilst any transverse components thereof are moving the ailerons. In such constructional arrangements it is essential that the longitudinal movements of the control rod do not notably influence the transverse movements. It is known that for fulfilling this requirement it is often necessary to use intricate constructions to be attached to the airplane fuselage at many points, especially in airplanes necessitating multiple control. Such constructions involve increased requirements placed on assembling operations resulting in very high production costs of the airplane.

The object of the present invention eliminates almost entirely all the above mentioned drawbacks, as its simple design enables the movement to be transmitted from one unit to another and thence to the airplane organs under control by means of simple links. Therefore it is possible, theoretically, to control the airplane from any suitable number of places in the airplane under the condition that the individual units may be interconnected by links. Each unit is supported per se in a fuselage bracket in two bearings thus fulfilling also the requirement of maximum simplicity of assembly. Figs. 1, 2 and 3 illustrate an embodiment of the arrangement according to this invention for two pilots side-by-side, Fig. 4 shows a single control, Fig. 5 illustrates the interconnection of several units.

The control device according to my invention comprises as best shown in Figs. 1 and 2 as well as in Fig. 4 a hollow lever member 1 which is journaled intermediate its ends by means of bearings 2, 2' in brackets 3 secured to the body of the airplane and which is allowed to swing in a plane parallel to the direction of flight as indicated by the arc A—B in Fig. 2. A link 8 controlling the elevators which are not shown in said figures is pivotally connected at 8' to the lower end of said lever member 1. A control or actuating rod 9 is with its forked end or extension 9' journaled by means of bearings 11, 11' and pivots 12, 12' to the upper end of said lever member 1. This rod 9 when swung in the direction A—B will actuate the swinging movement of said hollow lever member 1. However, this rod 9 may also be swung independently about the pivots 12, 12' in a direction perpendicular to the direction of flight as indicated by the arc C—D in Fig. 1. This latter swing movement is utilized to control the ailerons, which are not shown in the figures, through the link 7 which is linked at 6 to a swing lever 4. This lever 4 is mounted in the upper part of the hollow lever member 1 and oscillates in bearings 5, 5' in a plane parallel to the swing axis of said lever member 1. The effective length of said swing lever 4 is equal to the distance between its swing axis passing through the bearings 5, 5' and the swing axis of lever member 1 passing through the bearings 2, 2'. The swing movement of the lever 4 is actuated by the transmission lever 14 the upper free end of which is linked to the control rod 9. In the shown embodiment the free end of the transmission lever 14 is slidably mounted in a ball joint 13 arranged in the tubular control rod 9. The said transmission lever 14 (see also Fig. 3) swings about an axis passing through the bearings 15, 15' which are arranged in the upper part of the swing lever 4. Said swing axis for the transmission lever 14 crosses the swing axis of the swing lever 4 in a plane essentially perpendicular to the length axis of the swing lever 4 at an angle $a$ smaller than 90°. It will be well understood that if the transmission lever 14 is swung by the control rod 9 in the direction C—D (Figs. 1 and 3) then the swing lever 4 will be forced to oscillate in a plane perpendicular to C—D that is in the oscillation plane of the hollow lever member 1 as indicated by the arc E—F in Fig. 2. It will be further understood that the amplitude of oscillation of said swing lever 4 will depend on the magnitude of the angle $a$.

Instead of a single control rod 9 as shown in Fig. 4 a pair of control rods 9 and 10 may be used as shown in Figs. 1 and 2 in case that two pilots seated side-by-side are in control of the airplane. In such case the said control rod 9 supports a two armed steering handle 16 linked thereto by the bearing 21 and a second rod 10 which is parallel to and of equal effective length as said rod 9 is linked to said handle 16 and said hollow lever member in the bearings 20 and 22, respectively, the rods 9 and 10 forming a parallelogram connection swinging, as indicated by the arc C—D in Fig. 1, in a plane perpendicular to the plane of oscillation of the hollow lever member 1. The rods 9 and 10 may be arranged side by side or, as shown in Figs. 1 and 2, the tubular middle portion of rod 10 may embrace the rod 9.

As illustrated in Fig. 5 two control devices according to my invention may be combined for cooperation in an airplane. Fig. 5 shows the combination of a device for double side-by-side control as illustrated in Figs. 1 and 2 with a single control device according to Fig. 4. The links 7 and 8 operating the elevators and the ailerons are connected to the lever member 1 and to the swinging lever 4 in each control device.

While specific embodiments of the invention have been shown and described in detail to illustrate the application of the principle thereto, it should be understood that the invention may be otherwise embodied without departing from such principles.

What I claim as my invention is:

1. A control device for adjusting the control surfaces of aircraft, comprising a hollow lever member, supporting means for said hollow member permitting an oscillation thereof in one plane about an axis intermediate the ends of said member, control-surface adjusting means attached at the lower end of said hollow member, an actuating rod linked to and oscillating with the hollow lever member and permitted also to swing in a plane perpendicular to the plane of oscillation of said hollow member, a swing lever mounted in the upper part of the hollow member to oscillate in the plane of oscillation of said member about an axis parallel to the swing axis of said hollow member, control-surface adjusting means attached to the free end of said swing lever, the effective length of the swing lever being equal to the distance between its swing axis and the swing axis of the hollow member, a transmission lever jointed to the swing lever and swingable upon an axis crossing the swing axis of the swing lever at an angle smaller than 90° essentially in a plane perpendicular to the length axis of the swing lever, the free end of said transmission lever being jointed to the actuating rod to follow the movements thereof.

2. A control device for adjusting the control surfaces of aircraft, comprising a hollow lever member, supporting means for said hollow member permitting an oscillation thereof in one plane about an axis intermediate the ends of said member, control-surface adjusting means attached at the lower end of said hollow member, an operating handle to actuate the control device, a pair of parallel rods of equal effective length arranged in a plane perpendicular to the plane of oscillation of said hollow lever member, said pair of rods actuating the said oscillation of said hollow lever member, each rod linked with one end to the handle and with the other to the hollow lever member thus forming a swingable parallelogram connection, a swing lever mounted in the upper part of the hollow member to oscillate in the plane of oscillation of said member about an axis parallel to the swing axis of said hollow member, control-surface adjusting means attached to the free end of said swing lever, the effective length of the swing lever being equal to the distance between its swing axis and the swing axis of the hollow member, a transmission lever jointed to the swing lever and swingable upon an axis crossing the swing axis of the swing lever at an angle smaller than 90° essentially in a plane perpendicular to the length axis of the swing lever, the free end of said transmission lever being jointed to one of the two connecting rods to follow the movements thereof.

3. A control device according to claim 2, wherein one of the two parallel rods is tubular in its middle portion and envelopes with this tubular portion the other rod.

JAROSLAV ŠLECHTA.

REFERENCES CITED

The following references are of record in the file of this patent:

UNITED STATES PATENTS

| Number | Name | Date |
|---|---|---|
| 939,193 | Hart | Nov. 2, 1909 |
| 1,024,941 | Lambert | Apr. 30, 1912 |
| 1,809,936 | Hilburn | June 16, 1931 |
| 2,180,116 | Lapsley | Nov. 14, 1939 |
| 2,222,204 | Newman et al. | Nov. 19, 1940 |
| 2,252,080 | Lapsley | Aug. 12, 1941 |